United States Patent [19]

Yano et al.

[11] Patent Number: 5,798,407
[45] Date of Patent: Aug. 25, 1998

[54] HYDROPHILIC RESIN COMPOSITION AND PROCESS FOR PRODUCING THE SAME

[75] Inventors: Kazunori Yano; Hiroyoshi Kaito; Akeharu Wakayama; Shuhei Yada, all of Yokkaichi, Japan

[73] Assignee: Mitsubishi Chemical Corporation, Tokyo-To, Japan

[21] Appl. No.: 722,221

[22] PCT Filed: Feb. 22, 1996

[86] PCT No.: PCT/JP96/00407

§ 371 Date: Oct. 22, 1996

§ 102(e) Date: Oct. 22, 1996

[87] PCT Pub. No.: WO96/26244

PCT Pub. Date: Aug. 29, 1996

[30] Foreign Application Priority Data

Feb. 22, 1995 [JP] Japan .................... 7-033853
Jun. 30, 1995 [JP] Japan .................... 7-166067
Feb. 6, 1996 [JP] Japan .................... 8-020243

[51] Int. Cl.$^6$ .................... C08L 33/06; C08L 31/02; C08L 37/00
[52] U.S. Cl. .................... 524/504; 524/513; 524/514; 524/517; 524/521; 524/522; 524/523
[58] Field of Search .................... 525/77, 74, 78, 525/79, 84, 207, 208, 221, 227, 217, 64, 66, 166, 179; 524/517, 521, 522, 523, 504, 513, 514

[56] References Cited

FOREIGN PATENT DOCUMENTS 0489967 6/1992 European Pat. Off. .

*Primary Examiner*—Patricia A. Short
*Attorney, Agent, or Firm*—Oblon, Spivak, McClelland, Maier & Neustadt, P.C.

[57] ABSTRACT

A hydrophilic resin composition comprising a water-absorptive resin (component A), a thermoplastic modified ethylene polymer (component B), and, if desired, a thermoplastic polymer (component C) which is different from the component B, the water-absorptive resin (component A) being present in an amount of 0.1 to 70% by weight of the total amount of the components A to C, the component A being uniformly dispersed in the thermoplastic polymers (components B+C), in the form of particles having an average particle diameter of 5 μm or less.

A process for producing a hydrophilic resin composition, comprising kneading a water-absorptive resin containing water (component A) whose water content is 25 to 80% by weight to obtain a rubber-like resin, incorporating a modified ethylene polymer (component B), and, if desired, a thermoplastic polymer (component C) and an additive (component D) into the rubber-like resin, and melt kneading the mixture.

9 Claims, No Drawings

HYDROPHILIC RESIN COMPOSITION AND PROCESS FOR PRODUCING THE SAME

TECHNICAL FIELD

The present invention relates to a hydrophilic resin composition in which a water-absorptive resin is uniformly and finely dispersed in a specific thermoplastic polymer, so that the water-absorptive resin is not separated from a molded product of the composition even after the resin has absorbed water and the molded product thus can show good retention of shape, and to a process for producing the same. The present invention also relates to a hydrophilic resin composition in which an additive is also uniformly dispersed in the above thermoplastic polymer and mutually acts with the water-absorptive resin, so that the composition is highly retentive of the effect of the additive, and to a process for producing the same.

BACKGROUND ART

Polyolefins, polyamides, polyesters and the like are excellent in moldability, mechanical strength, etc., and have been widely used as raw materials for packaging materials, containers, synthetic paper, fibers, etc. However, they are not so highly reactive that they are poor in printability, adhesive properties, and hydrophilic nature; or even if they are hydrophilic, the hydrophilic nature has not yet reached to a level high enough for such applications as fibers and the like. For this and other reasons, these resins have been hitherto limited in their use.

In order to improve the hydrophilic nature, there has been proposed a resin composition prepared by incorporating a water-absorptive resin into a polyolefin, polyamide, polyester resin or the like. However, it is difficult to uniformly and finely disperse a water-absorptive resin in such a resin. In addition, the diameters of dispersed particles of the water-absorptive resin are as large as 20 to 60 μm, and the particles cannot be uniformly dispersed. Therefore, the water-absorptive resin is separated from a molded product of the composition after it has absorbed water, and the molded product thus shows poor retention of shape and has unsatisfactory mechanical strength.

Some methods have been proposed as methods for uniformly and finely dispersing a water-absorptive resin.

Namely, for instance, a method in which fine powder obtained by polymerization for producing a crosslinked product of vinyl acetate/methyl acrylate copolymer, or fine powder obtained by mechanically grinding this crosslinked product by an apparatus such as a jet mill is incorporated, as a water-absorptive resin, into a polyolefin and the resulting mixture is subjected to molding (Japanese Laid-Open Patent Publication No. 33032/1981). However, although the level of hydrophilic nature can be slightly improved by this method, it is still unsatisfactory because the diameters of the dispersed particles of the water-absorptive resin are still large. Moreover, this method requires a step of grinding the water-absorptive resin, so that it is also disadvantageous from the viewpoint of facilities.

There has also been proposed a method in which a water-absorptive resin containing carboxylate group and a polyolefin containing glycidyl group are melt kneaded with each other (Japanese Laid-Open Patent Publications Nos. 266427/1986 and 31733/1988). However, although the level of hydrophilic nature can be improved by this method, there cannot be obtained a composition uniformly imparted with hydrophilic nature, capable of showing satisfactory retention of shape and mechanical strength even after it has absorbed water. This method has thus been needed to be improved.

Further, there has also been proposed a sheet or film in which a polyamide or polyester is a continuous phase, and a water-absorptive resin existing as dispersed particles with a diameter of 10 to 100 μm is a dispersed phase (Japanese Laid-Open Patent Publication No. 62529/1986). However, although this one has an improved level of hydrophilic nature, it cannot show satisfactory retention of shape after it has absorbed water because the diameters of the dispersed particles of the water-absorptive resin are still large.

In addition, there has been proposed a resin composition which is obtained by incorporating a water-absorptive resin containing as a main component acrylic acid into a polyamide (Japanese Laid-Open Patent Publication No. 190046/1982). This one also has an improved level of hydrophilic nature, but the level is insufficient. Moreover, the diameters of the dispersed particles of the water-absorptive resin are still large, so that this resin composition cannot show satisfactory retention of shape after it has absorbed water.

Furthermore, it is necessary to further improve the hydrophilic nature and the retentivity thereof in order to fulfill the recent severe requirements.

On the other hand, thermoplastic resins containing a water-absorptive resin are used as a variety of molding materials, and various additives are incorporated into the resins so as to impart thereto such properties as durability, antistatic properties, flame retardant properties, slip properties, mildew resistance and hydrophilic nature. It is also necessary to further improve these properties in order to meet the recent severe requirements.

An object of the present invention is to overcome the aforementioned drawbacks in the prior art, thereby providing a hydrophilic resin composition which can show good retention of shape without undergoing the separation of a water-absorptive resin from a molded product of the composition even after the water-absorptive resin has absorbed water, and also a hydrophilic resin composition having improved retentivity of the effects of those additives which are incorporated therein.

DISCLOSURE OF THE INVENTION

We made earnest studies in order to solve the aforementioned problems, and, as a result, found that a resin composition comprising a thermoplastic resin which contains a specific amount of a water-absorptive resin and in which the water-absorptive resin is present as uniformly dispersed particles having a specific diameter is free from the separation of the water-absorptive resin from a molded product of the resin composition even after the water-absorptive resin has absorbed water and can show good retention of shape because the water-absorptive resin is uniformly dispersed in the thermoplastic resin, that a composition obtained by further adding a specific amount of an additive to the above resin composition is highly retentive of the effect of the additive because the additive is also homogeneously dispersed in the composition and mutually acts with the water-absorptive resin, and that the above-described object can be attained by these resin compositions. The present invention has been accomplished on the basis of these findings.

Thus, the hydrophilic resin composition of the present comprises a water-absorptive resin (component A), a thermoplastic modified ethylene polymer (component B), and, if desired, a thermoplastic polymer (component C) which is different from the component B, the water-absorptive resin (component A) being present in an amount of 0.1 to 70% by weight of the total amount of the components A, B and C, the component A being uniformly dispersed in the thermoplastic polymers (components B and C), in the form of particles having an average particle diameter of 5 micrometers or less.

Further, the process for producing a hydrophilic resin composition of the present invention comprises kneading a water-absorptive resin containing water (component A) whose water content is 25 to 80% by weight to obtain a rubber-like resin, incorporating a modified ethylene polymer (component B), and, if desired, a thermoplastic polymer (component C) and an additive (component D) into the rubber-like resin, and melt kneading the mixture.

BEST MODE FOR CARRYING OUT THE INVENTION

[1] Production of Hydrophilic Resin Composition
(1) Raw Materials
(A) Water-Absorptive Resin (Component A)

In general, the water-absorptive resin (component A) for use in the hydrophilic resin composition of the present invention can be properly selected from known water-absorptive resins.

Specific examples of the water-absorptive resin include crosslinked products of (meth)acrylate polymers, saponified products of (meth)acrylic ester/vinyl acetate copolymers or crosslinked products thereof, crosslinked products of saponified products of starch/(meth)acrylic acid graft copolymers, crosslinked products of saponified products of starch/acrylonitrile graft copolymers, and crosslinked products of saponified products of starch/(meth)acrylic ester graft copolymers. Of these, crosslinked products of (meth) acrylate polymers are preferred.

The term "(meth)acrylic acid" as used herein means "acrylic acid and methacrylic acid".

It is noted that modified copolymers obtained by copolymerizing the components of the above specifically-enumerated resins with other copolymerizable monomer can also be used as long as they do not impart unfavorable properties to the water-absorptive resin. Examples of a copolymerizable monomer which can impart not unfavorable but favorable properties to the water-absorptive resin include carboxylic acid or salts thereof, phosphoric acid or salts thereof, sulfonic acid or salts thereof, and water-soluble ethylenic unsaturated monomers containing, as a functional group, a group derived from the above acids or salts thereof. Besides the water-soluble ethylenic unsaturated monomers, (meth)acrylamide, 2-hydroxyethyl (meth)acrylamide, (poly) ethylene glycol mono(meth)acrylate, 2-hydroxyethyl (meth) acrylate and the like can be mentioned as examples of the copolymerizable monomer. One, or two or more of these monomers can be used in such an amount that the function of the water-absorptive resin will not be drastically impaired.

There is a case where these water-absorptive resins are of salt type. Examples of such resins include those of the type of alkaline metal salts such as Na and K salts, and those of the type of alkaline earth metal salts such as Mg and Ca salts; particularly preferred are those of the type of alkaline metal salts. It is possible to use, as the water-absorptive resin, two or more of the above-described water-absorptive resins in combination.

(B) Modified Ethylene Polymer (Component B)

A modified ethylene polymer which is a thermoplastic polymer, which has a functional group that can chemically bond to or is compatible with the above-described water-absorptive resins, and whose melting point measured by a DSC (differential scanning calorimeter) is generally in the range of 80° to 120° C., preferably in the range of 82° to 115° C., particularly in the range of 85° to 110° C. is suitable as the modified ethylene polymer (component B) for use in the hydrophilic resin composition of the present invention.

When the modified ethylene polymer has a melting point which is too high, it is difficult to finely disperse the water-absorptive resin therein. Therefore, the resulting composition cannot have a satisfactory level of hydrophilic nature, and also tends to show poor retention of shape after it has absorbed water. On the other hand, a modified ethylene polymer whose melting point is too low is unfavorable because the resulting composition will have the problem of poor heat resistance.

The modified ethylene polymer can be obtained by a method in which ethylene and an unsaturated monomer containing as a functional group hydroxyl, acid anhydride, carboxyl, amino or glycidyl group or other group are copolymerized; a method in which ethylene polymer and an unsaturated monomer containing as a functional group hydroxyl, acid anhydride, carboxyl, amino or glycidyl group or other group are subjected to the graft polymerization conditions; or a method in which ethylene polymer is thermally decomposed. Those polymers which are obtained by further diluting, with proper ethylene polymer, the products of the above methods can also be suitably used.

For example, ethylene homopolymer, or a random or block copolymer in which ethylene is a main component and other α-olefin is a secondary component is herein suitably used as the ethylene polymer. For instance, propylene, butene-1, hexene-1, 3-methylbutene-1, 4-methylpentene-1, heptene-1, octene-1, decene-1 and the like can be mentioned as examples of the above-described other α-olefin.

Further, there can be mentioned, as examples of the unsaturated monomer containing as a functional group hydroxyl, carboxyl, acid anhydride, amino or glycidyl group or other group, hydroxyl-group-containing unsaturated carboxylic esters such as hydroxyethyl methacrylate and hydroxypropyl methacrylate; unsaturated carboxylic acids and anhydrides thereof such as maleic anhydride, (meth) acrylic acid, itaconic acid and crotonic acid; amino-group-containing unsaturated monomers such as amino(meth) acrylate and aminoalkoxy vinylsilane; glycidyl-group-containing unsaturated carboxylic esters such as glycidyl (meth)acrylate; vinyl esters such as vinyl acetate and vinyl butyrate; unsaturated carboxylic esters such as methyl (meth)acrylate and ethyl (meth)acrylate; and metallic salts of an unsaturated carboxylic acid such as sodium (meth) acrylate and zinc (meth)acrylate.

The content, in the modified ethylene polymer, of the unsaturated monomer containing as a functional group hydroxyl, carboxyl, acid anhydride, amino or glycidyl group or other group is from 0.05 to 20% by weight, preferably from 0.1 to 15% by weight, particularly from 0.1 to 10% by weight. When this content is too low, the desired effects cannot be expected, and when the content is higher than the above range, the production process becomes intricate; such contents are thus unfavorable.

Among such modified ethylene polymers, preferable ones are specifically, for example, ethylene/glycidyl (meth) acrylate copolymers, ethylene/(meth)acrylate copolymers, ethylene/vinyl acetate copolymers, ethylene/(meth)acrylic ester copolymers, metallic salts of ethylene/(meth)acrylic acid copolymer (ionomers of sodium salt, zinc salt, etc.). It is noted that these modified ethylene copolymers can be used in combination.

(C) Thermoplastic Polymer (Component C)

In general, the thermoplastic polymer (component C) for use in the hydrophilic resin composition of the present invention can be suitably selected from known thermoplastic polymers.

Specific examples of the thermoplastic polymer include polyolefins, polyvinyl chloride, polyvinylidene chloride, polystyrene, polymethyl methacrylate, polyvinyl acetate, polyvinyl alcohol, polyvinyl ethers, polyvinyl butyrate, polyvinyl formal, cellulose resins, polyamides, polyesters, polycarbonate, polyphenylene ethers, polyphenylene sulfide, polysulfone, polyimide, polyamide imide, polyether imide, polyether ketone, polyether ether ketone, polyacetals, polyacrylate, polyallylamine and polyethylene oxide. Of these, polyolefins, polyamides and polyesters are preferably used, and, in particular, polyolefins, especially crystalline polyolefins are preferably used. A mixture of a plurality of these thermoplastic polymers can also be used.

Examples of polyolefins include homopolymers of α-olefins such as ethylene, propylene, butene-1, hexene-1, -methylbutene-1, 4-methylpentene-1, heptene-1, octene-1 and decene-1, random or block copolymers of two or more of these α-olefins, random, block or graft copolymers in which an α-olefin is a main component and other copolymerizable monomer is a secondary component, and a mixture of these polymers.

The unsaturated monomer containing as a functional group hydroxyl, acid anhydride, carboxyl, amino or glycidyl group or other group, which is a component of the above-described modified ethylene polymer, the component B, can be used herein as the above-described other copolymerizable monomer.

Of the above polyolefins, ethylene polymer and propylene polymer are preferably used. Specifically, suitable ones are ethylene or propylene homopolymer, random or block copolymers in which ethylene or propylene is a main component and other α-olefin is a secondary component (Ethylene and propylene are also in the relationship of other α-olefin with each other, and this other α-olefin can be two or more α-olefins. The same shall apply hereinafter.), random, block or graft copolymers in which ethylene or propylene (if necessary, other α-olefin can be included) is a component of the largest proportion and other copolymerizable monomer is a secondary component, or a mixture of these polymers.

In particular, ethylene polymer is preferred from the viewpoints of adhesive properties and processability, and propylene polymer or the like whose melting point measured by a DSC is 130° C. or higher, preferably from 135° to 180° C., particularly from 140° to 170° C. is preferred when heat resistance is taken into consideration. Further, polymers whose MFR (melt flow rate) is from 0.1 to 200 g/10 min, especially from 0.3 to 150 g/10 min are preferred from the viewpoints of moldability and mechanical strength.

Polyamides are thermoplastic crystalline and/or non-crystalline high-molecular-weight solid polymers including a homopolymer, copolymer and/or terpolymer having repeated amide unit in the polymer chain thereof. Of these, nylons having a softening or melting point of 100° C. or higher, especially 160° to 280° C. are preferred. Specifically, there can be mentioned, for example, polylactams such as nylon 6 (polycaprolactam), nylon 3 (polypropiolactam), nylon 7 (polyenanthlactam), nylon 8 (polycapryllactam) and nylon 12 (polylauryllactam); amino acid homopolymers such as nylon 11 (polyaminodecanoic acid); nylon 4 (polypyrodinone); dicarboxylic acid-diamide copolymers such as nylon, 6,6 (hexamethylene adipamide), nylon 4,6 (polytetra-methylene adipamide), nylon 4,2 (polytetramethylene oxalamide), nylon 6,10 (polyhexamethylene sebacamide), nylon 6,1 (polyhexamethylene isophthalamide), and nylon 6,12 (polyhexamethylene dodecanoic acid); aromatic or partially aromatic polyamides; copolyamides such as nylon 6/6,6 (a copolymer of caprolactam and hexamethylene adipamide); terpolyamides such as nylon 6/6,6/6,10; and block copolymers such as polyether polyamide. Of these, nylon 6 is preferred; these polyamides can be used in combination.

Polyesters are linear crystalline and/or non-crystalline high-molecular-weight solid polymers having the repeated unit of —CO—O— including —O—CO—O— group in the polymer chain thereof. Of these, polyesters having a softening or melting point of 100° C. or higher, especially 160° to 280° C. are preferred. Specifically, there can be mentioned, for instance, polyalkylene terephthalates such as polyethylene terephthalate (PET) and polybutylene terephthalate (PBT); polyalkylene isophthalates such as polyethylene isophthalate and polytetramethylene isophthalate; and polyalkylene naphthalates such as polyethylene-2,6-naphthalate and polybutylene-2,6-naphthalate. Of these, PET and PBT are preferably used.

(D) Additive (Component D)

In general, any known additive can be used as the additive (component D) for use in the hydrophilic resin composition of the present invention. However, an additive whose effect is required to last is preferred. Examples of such an additive include antioxidants, ultraviolet absorbers, photostabilizers, stabilizers for vinyl chloride resin, antistatic agents, flame retarders, slip agents, mildewproofing agents, surface active agents, coloring agents, perfumes and metal-inactivating agents. Of these, antioxidants, ultraviolet absorbers, photostabilizers and surface active agents are preferably used.

Antioxidants

Examples of the antioxidants include phenol antioxidants such as 2,6-di-t-butyl-4-methylphenol, 2,2'-methylene-bis-(4-methyl-6-t-butylphenol), 4,4'-butylidene-bis-(3-methyl-6-t-butylphenol), 4,4'-thiobis-(3-methyl-6-t-butylphenol), octadecyl-3-(3,5-t-butyl-4-hydroxyphenyl) propionate, tetrakis-[methylene-3-(3',5'-di-t-butyl-4'-hydroxyphenyl) propionate]-methane, 6-(3,5-di-t-butyl-4-hydroxyanilino)-2, 4-bis-octylthio-1,3,5-triazine, tris-(3,5-di-t-butyl-4-hydroxybenzyl)-isocyanurate and tris-(4-t-butyl-2,6-dimethyl-3-hydroxybenzyl)-isocyanurate; sulfur antioxidants such as di-lauryl-thio-di-propionate, di-tridecyl-thio-di-propionate, di-myristyl-thio-di-propionate, di-stearyl-thio-di-propionate and pentaerythritol-tetrakis-(β-lauryl-thiopropionate); and phosphorous antioxidants such as tris(isodecyl) phosphite, tris (tridecyl) phosphite, phenyl-di-isooctyl phosphite, phenyl-di-tridecyl phosphite, diphenylisooctyl phosphite, diphenylisodecyl phosphite, diphenyltridecyl phosphite, phosphonous acid [1,1-biphenyl-4,4'-diylbistetrakis[2,4-bis (1,1-dimethylethyl)phenyl)ester], triphenyl phosphite, tris (nonylphenyl) phosphite, 4,4'-isopropylidene-diphenylalkyl phosphite, tris(2,4-di-t-butylphenyl) phosphite, tris (biphenyl) phosphite, distearylpentaerythritol diphosphite, di(2,4-di-t-butylphenyl)pentaerythritol diphosphite, di(nonylphenyl)penta-erythritol diphosphite, phenyl-bisphenol A pentaerythritol diphosphite, tetratridecyl-4,4'-butylidene-bis(3-methyl-6-t-butylphenol)-di-phosphite, hexatridecyl-1,1,3-tris(2-methyl-4-hydroxy-5-t-butylphenyl)butane triphosphite and 3,5-di-t-butyl-4-hydroxybenzylphosphite-di-ethylester.

Of these, tetrakis-[methylene-3-(3',5'-di-t-butyl-4'-hydroxyphenyl)propionate]methane, octadecyl-3-(3,5,t-butyl-4-hydroxyphenyl)propionate and tris-(3,5-di-t-butyl-4-hydroxybenzyl)isocyanurate, which are phenol antioxidants, are preferred; the combination use of these phenol antioxidants and sulfur antioxidants is more preferred.

Ultraviolet Absorbers

Examples of the ultraviolet absorbers include salicylate compounds such as phenyl salicylate, 4-t-butylphenyl salicylate, 2,4-di-t-butylphenyl-3,5'-di-t-butyl-4'-hydroxybenzoate and 4-t-octylphenyl salicylate; benzophenone compounds such as 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, bis(5-benzoyl-4-hydroxy-2-methoxyphenyl)methane, 2,2'-dihydroxy-4-methoxybenzophenone, 2,2'-dihydroxy-4,4'-dimethoxybenzophenone, 2,2',4,4'-tetrahydroxybenzophenone, 4-dodecyloxy-2-hydroxybenzophenone, and 2-hydroxy-4-methoxy-2'-carboxybenzophenone; benzotriazole compounds such as 2-(2'-hydroxy-5'-methoxyphenyl)benzotriazole, 2-[2'-hydroxy-3'-5'-bis($\alpha,\alpha$-dimethylbenzyl)phenyl]-benzotriazole, 2-(2'-hydroxy-3'-5'-di-t-butylphenyl)benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-di-t-amylphenyl)benzotriazole, 2-(2'-hydroxy-5'-t-octylphenyl)benzotriazole and 2,2'-methylenebis[4-(1,1,3,3-tetramethylbutyl)-6-(2N-benzotriazole-2-yl)phenol; and cyanoacrylate compounds such as ethyl-2-cyano-3,3-diphenyl acrylate, 2-ethylhexyl-2-cyano-3,3'-diphenyl acrylate and butyl-2-cyano-3-methyl-3-(p-methoxyphenyl)acrylate.

Of these, 4-t-butylphenyl salicylate, 2-hydroxy-4-n-octoxybenzophenone, 2-hydroxy-4-ethoxybenzophenone, 2,2'-dihydroxy-4-methoxybenzophenone, 2-(2'-hydroxy-3',5'-di-t-butyl-phenyl)benzotriazole, 2-(2'-hydroxy-3'-t-butyl-5'-methylphenyl)-5-chlorobenzotriazole and 2-(2'-hydroxy-3',5'-di-t-amylphenyl)benzotriazole are preferably used.

Photostabilizers

Examples of the photostabilizers include hindered amine compounds such as phenyl-4-piperidyl carbonate, bis-(2,2,6,6-tetramethyl-4-piperidyl)sebacate, bis-(N-methyl-2,2,6,6-tetramethyl-4-piperidyl)sebacate, bis-(1,2,2,6,6-pentamethyl-4-piperidyl)-2-(3,5-di-t-butyl-4-hydroxybenzyl)-2-n-butylmalonate, poly[6-(1,1,3,3-tetramethylbutyl)imino-1,3,5-triazine-2,4-diyl][(2,2,6,6-tetramethyl-4-piperidyl)imino]-hexamethylene[2,2,6,6-tetramethyl-4-piperidyl)iminol], tetrakis(2,2,6,6-tetramethyl-4-piperidyl)-1,2,3,4-butanetetracarboxylate, 1,1'-(1,2-ethanediyl)bis(3,3,5,5-tetramethylpiperadinone), dimethylsuccinate polymer with 4-hydroxy-2,2,6,6-tetramethyl-1-piperidine ethanol, a mixture of 2,2,6,6-tetramethyl-4-piperadyl-1,2,3,4-butanetetracarboxylate and tridecyl-1,2,3,4-butanetetracarboxylate, a mixture of 1,2,2,6,6-pentamethyl-4-piperidyl-1,2,3,4-butanetetracarboxylate and tridecyl-1,2,3,4-butanetetracarboxylate, a mixture of 2,2,6,6-tetramethyl-4-piperidyl-1,2,3,4-butanetetracarboxylate and $\beta$, $\beta$, $\beta'$, $\beta'$-tetramethyl-3,9-[2,4,8,10-tetraoxaspiro(5,5)undecane]diethyl-1,2,3,4-butanetetracarboxylate, and a mixture of 1,2,2,6,6-pentamethyl-4-piperidyl-1,2,3,4-butanetetracarboxylate and $\beta$, $\beta$, $\beta'$, $\beta'$-tetramethyl-3,9-[2,4,8,10-tetraoxa-spiro(5,5) undecane]diethyl-1,2,3,4-butanetetracarboxylate.

Of these, bis-(2,2,6,6-tetramethyl-4-piperidinyl) sebacate, bis-(N-methyl-2,2,6,6 tetramethyl-4-piperidinyl)sebacate and tetrakis(2,2,6,6-tetramethyl-4-piperidinyl)-1,2,3,4-butanetetracarboxylate are preferred.

Stabilizers for Vinyl Chloride Resin

Examples of the stabilizers for vinyl chloride resin include organic tin stabilizers such as di-n-octyltin bis (isooctylglycolic ester) salt, di-n-octyltin maleate polymer, di-n-octyltin dilaurate, di-n-octyltin maleic ester salt, di-n-butyltin bismaleic ester salt, di-n-butyltin maleate polymer, di-n-butyltin bisoctylthioglycol ester salt, di-n-butyltin beta-mercaptoproprionate polymer, di-n-methyltin bis (isooctylmercaptoacetate) salt; lead stabilizers such as tribasic lead sulfate, dibasic lead phosphite, basic lead sulfite, dibasic lead phthalate and lead silicate; and metallic soap stabilizers such as cadmium soap, zinc soap, barium soap, lead soap and calcium stearate.

Of these, lead stabilizers and metallic soap stabilizers are preferably used.

Antistatic Agents

Examples of the antistatic agents include nonionic compounds such as poly(oxyethylene) alkylamines, poly (oxyethylene) alkylamides, poly(oxyethylene) alkyl ethers, poly(oxyethylene) alkylphenylene ethers, glycerin fatty acid esters and sorbitan fatty acid esters; anionic compounds such as alkyl sulfonates, alkylbenzene sulfonates, alkyl sulfates and alkyl phosphates; cationic compounds such as quaternary ammonium chloride, quaternary ammonium sulfate and quaternary ammonium nitrate; amphoteric compounds such as alkyl betaines, alkyl imidazolines and alkyl alanines; and electroconductive resin compounds such as polyvinyl benzyl cation and polyacrylic acid cation.

Of these, nonionic compounds and amphoteric compounds are preferably used.

Flame Retarders

Examples of the flame retarders include halogen compounds such as tetrabromobisphenol A, 2,2-bis(4-hydroxy-3,5-dibromophenyl)propane, hexabromobenzene, tris(2,3-dibromopropyl)isocyanurate, 2,2-bis(4-hydroxyethoxy-3,5-dibromophenyl)propane and decabromodiphenyl oxide; phosphorus compounds such as ammonium phosphate, tricresyl phosphate, tris($\beta$-chloroethyl) phosphate, trischloroethyl phosphate, trisdichloropropyl phosphate, cresyl diphenyl phosphate and xylenyl diphenyl phosphate; and inorganic compounds such as red phosphorus, tin oxide, antimony trioxide, zirconium hydroxide, barium metaborate, ammonium hydroxide and magnesium hydroxide.

Of these, tetrabromobisphenol A, phosphorus compounds and antimony trioxide are preferably used.

Slip Agents

Examples of the slip agents include aliphatic hydrocarbon compounds such as liquid paraffins, microcrystalline waxes, natural paraffins, synthetic paraffins and polyolefin waxes; and metallic soap compounds such as barium stearate, calcium stearate, zinc stearate, aluminum stearate and magnesium stearate.

Of these, aliphatic hydrocarbon compounds are preferably used.

Mildewproofing Agents

Examples of the mildewproofing agent include 10,10'-oxybisphenoxyarsine, N-(fluorodichloromethylthio) phthalimide, N-dimethyl-N'-phenyl-N'-(fluorodichloromethylthio)sulfamide and 2-methoxycarbonylaminobenzimidazole.

Surface Active Agents

A surface active agent suitably selected from known ones can be generally used as the surface active agent. In general, surface active agents are classified into anionic, cationic, ampholytic and nonionic surface active agents, depending upon the structure thereof and the type of the electric charge formed when they are dissociated in an aqueous solution.

Examples of the anionic surface active agent include carboxylates such as fatty acid soaps, N-acylamino acid salts, alkyl ether carboxylates and acylated peptides; sulfonates such as alkyl sulfonates, alkylbenzene sulfonates, alkylnaphthalene sulfonates, sulfosuccinic acid, α-olefin sulfonates, N-acylsulfonates, alkyl sulfoacetates and N-acylmethyl taurines; sulfuric ester salts such as sulfonated oils, alkyl sulfonates, alkyl ether sulfonates, alkylallyl ether sulfonates and alkylamide sulfonates; and phosphoric ester salts such as alkyl phosphates, alkyl ether phosphates and alkylallyl ether phosphates.

Examples of the cationic surface active agent include aliphatic amine salts; aliphatic quaternary ammonium salts; aromatic quaternary ammonium salts such as benzalkonium salts and benzethonium chloride; and heterocyclic quaternary ammonium salts such as pyridinium salts and imidazolinium salts.

Examples of the ampholytic surface active agent include those of carboxy betaine type such as alkyldimethyl betaines; those of sulfobetaine type; aminocarboxylates; and imidazoline derivatives.

Further, examples of the nonionic surface active agent include those of ether type such as alkyl and alkylacryl polyoxyethylene ethers, alkylallyl formaldehyde-condensed polyoxyethylene ethers, block polymers containing polyoxypropylene as a lipophilic group and polyoxyethylene polyoxypropyl alkyl ethers; those of ether ester type such as polyoxyethylene ether of glycerol ester, polyoxyethylene ether of sorbitan ester and polyoxyethylene ether of sorbitol ester; those of ester type such as polyethylene glycol fatty ester, glycerol ester, sorbitan ester, propylene glycol ester and sucrose ester; and those of nitrogen-containing type such as fatty acid alkanol amides, polyoxyethylene fatty acid amides, polyoxyethylene alkylamines and amine oxide.

Of these surface active agents, anionic and nonionic surface active agents are preferably used. Among the anionic surface active agents, sulfonates such as alkylbenzene sulfonates are particularly preferred; among the nonionic surface active agents, those of ether ester type and of ester type are particularly preferred.

Coloring Agents

Examples of the coloring agent include inorganic pigments such as titanium oxide, iron oxide, chrome yellow and ultramarine blue; and organic pigments such as azo, phthalocyanine, quinacridone, isoindolinone, perylene, perinone, anthraquinone, quinophthalone and diketopyrrolopyrrole pigments.

Of these, titanium oxide, iron oxide and phthalocyanine pigments are preferably used.

Perfumes

Examples of the perfumes include acetophenone, methyl salicylate, vanillin, ethyl vanillin and coumarin.

Of these, acetophenone and methyl salicylate are preferably used.

Metal-Inactivating Agents

Examples of the metal-inactivating agents include oxalic acid derivatives such as oxalic acid bis(benzylidenehydrazine) and N,N'-bis[2-[3-(3,5-di-t-butyl-4-hyroxyphenyl)propionyloxy]ethyl]oxamide; salicylic acid derivatives such as 3-(N-salicyloyl)amino-1,2,4-triazole, dodecanedioic acid bis[2-(2-hydroxybenzoyl)hydrazide] and N-salicyloyl-N'-salicylidenehydrazine; and hydrazide derivatives such as N,N'-bis[3-(3,5-di-t-butyl-4-hydrophenyl)propionyl]-hydrazine and isophthaloic acid bis [2-phenoxypropionyl-hydrazine].

Of these, oxalic acid derivatives are preferably used.

In the present invention, it is possible to use either two or more additives which have the same function, or two or more additives which have different functions within such a limit that the effects of the present invention will not be drastically impaired.

(2) Blend Ratio of Components

In the hydrophilic resin composition of the present invention, the water-absorptive resin (component A) is incorporated in an amount of 0.1 to 70% by weight, preferably 0.5 to 60% by weight, and more preferably 1 to 50% by weight of the total amount of the components A, B and C. Further, it is preferable that 1 to 70% by weight of the water-absorptive resin (component A) be blended with 99 to 30% by weight of the modified ethylene polymer (component B) and that 99 to 0 parts by weight of the thermoplastic polymer (component C) be incorporated into 1 to 100 parts by weight of the total of the components A and B (the total amount of components A, B and C being 100 parts by weight). It is more preferable that 2 to 60% by weight of the component A be blended with 98 to 40% by weight of the component B (the total amount of components A and B being 100% by weight) and that 98 to 20 parts by weight of the component C be incorporated into 2 to 80 parts by weight of the total of the components A and B (the total amount of components A, B and C being 100 parts by weight). The additive (component D) is incorporated in an amount of preferably from 0.05 to 10 parts by weight, more preferably from 0.1 to 8 parts by weight for 100 parts by weight of the total of the components A, B and C.

When the amount of the component A is too small, the desired retentivity of the effect of the additive cannot be obtained, and when it is too large, the resulting composition is insufficient in moldability and mechanical strength.

Further, when the amount of the component B is too small, the fine dispersion of the component A cannot be fully attained, so that the resulting composition cannot show sufficiently high retention of shape and mechanical strength after it has absorbed water. On the other hand, when the amount of the component B is too large, the resulting composition is insufficient in retentivity of the effect of the additive.

When the amount of the component C is too large, there is such a tendency that the resulting composition cannot have desired retentivity of the effect of the additive. Further, when the amount of the component D is too large, the resulting composition tends to cause bleeding and to have the problem of insufficient mechanical strength.

[II] Process for Producing Hydrophilic Resin Composition

A hydrophilic resin composition of the present invention, in which a water-absorptive resin is present as uniformly dispersed particles with an average particle diameter of 5 μm or less, can be produced by the following process.

Thus, a water-absorptive resin containing water (component A) whose water content is 25 to 80% by weight is kneaded to obtain a rubber-like resin; a modified ethylene polymer (component B), and, if desired, a thermoplastic polymer (component C) and an additive (component D) are then added to the rubber-like resin; and the mixture is subjected to melt kneading to obtain a hydrophilic resin composition.

It is preferable to carry out the melt kneading in the following manner: the rubber-like water-absorptive resin containing water (component A) and the modified ethylene polymer (component B) are firstly melt kneaded to obtain a composition; the thermoplastic polymer (component C) and the additive (component D) are then added to the composition; and the resulting mixture is melt kneaded.

(1) Preparation of Rubber-Like Water-Absorptive Resin Containing Water

It is very important in the present invention to firstly obtain a rubber-like water-absorptive resin containing water by kneading a water-absorptive resin containing water whose water content is 25 to 80% by weight. A water-absorptive resin has a three-dimensional crosslinked structure. This resin swells reticulately, and includes water in the net, whereby the resin absorbs water. The state of a water-absorptive resin varies greatly depending upon the water content of the resin. For instance, when the water content is less than 25% by weight, the water-absorptive resin has an extremely high viscosity due to the crosslinked structure thereof, so that it becomes non-sticky independent particles. When the water content is in excess of 80% by weight, the water-absorptive resin becomes a jelly-like aggregate. On the other hand, when the water content is from 25 to 80% by weight, the water-absorptive resin becomes an aggregate of particles with the surfaces thereof adhered to each other, although the aggregate is readily broken. By kneading the water-absorptive resin in such a state, a rubber-like material which is an indeterminate continuum can be readily obtained. It has been made possible to finely disperse a water-absorptive resin only when such a rubber-like water-absorptive resin containing water is used. This was an unexpected finding.

Thus, in order to obtain this rubber-like water-absorptive resin containing water, it is convenient to use a method in which a water-absorptive resin containing 25 to 80% by weight of water is kneaded. However, a desired rubber-like water-absorptive resin containing water can also be obtained, for example, from a water-absorptive resin containing water whose water content is in excess of 80% by weight, which is in the form of a jelly-like aggregate, by kneading the resin while removing the water by means of volatilization or the like so as to finally make the water content of the resin to 25 to 80% by weight; or from a water-absorptive resin containing water whose water content is less than 25% by weight, which is in the state of independent particles, by kneading the resin with the addition of water so as to finally make the water content of the resin to 25 to 80% by weight. It is therefore a matter of course in the present invention that the above-described "kneading a water-absorptive resin containing water whose water content is 25 to 80% by weight to obtain a rubber-like water-absorptive resin containing water" includes these embodiments. The suitable kneading temperature is from 30° to 90° C. However, there is also a method in which the kneading is carried out with or without the volatilization of water. Therefore, the kneading temperature is not always limited to the above range. A method in which a water-absorptive resin containing water whose water content is 30 to 80% by weight, preferably 30 to 75% by weight, particularly 30 to 70% by weight is kneaded is more convenient, and it is thus preferred.

The water-content of a water-absorptive resin can be adjusted by a method in which a predetermined amount of water is added to a water-absorptive resin containing no water or having a low water content and the resultant is mixed by an apparatus such as a stirrer; or when the water-absorptive resin is a crosslinked product of acrylate polymer, the water content of the resin can be adjusted by a method in which a water-absorptive resin that is not subjected to drying after polymerization (that is, the resin contains water already) is mixed by an apparatus such as a stirrer.

(2) Preparation of Water-Absorptive Resin Composition (Melt Kneading)

The melt kneading for producing a hydrophilic resin composition of the present invention can be carried out by the use of a conventional melt kneading apparatus, for instance, a single- or twin-screw extruder, a Bunbury mixer, a mixing roll, a kneader blender, a Brabender Plastograph, a horizontal twin-screw reactor or the like. Of these, preferable one is a twin-screw extruder, by which fine dispersion can be readily attained. It is preferable to select the melt kneading temperature so that it will be 5° to 100° C. higher than the melting or softening point of the component C. For instance, when a crystalline low-density polyethylene having a crystallinity of approximately 60% is used, the melt kneading temperature is properly selected from the range of 130° to 230° C.

When the melt kneading temperature is too high, those resins which are employed tend to be thermally deteriorated, and the resulting composition will have the problems of decreased mechanical strength, coloration and the like. Further, there is a tendency that it becomes difficult to finely disperse the water-absorptive resin.

[III] Hydrophilic Resin Composition (1) Physical Properties

The hydrophilic resin composition of the present invention thus obtained comprises the aforementioned components in the above-described contents. In the composition, 0.1% by weight or more and approximately 60% by weight or less, preferably from 0.5 to 50% by weight, particularly from 1 to 40% by weight of the water-absorptive resin is contained, and the resin is present as uniformly dispersed particles with an average particle diameter of 5 μm or less.

The average particle diameter is preferably from 0.1 to 4 μm, particularly from 0.1 to 3 μm. When the average particle diameter is too large, the resulting composition shows impaired retention of shape after it has absorbed water, has a worse appearance and decreased mechanical strength, and cannot be uniformly imparted with hydrophilic nature. Further, when the amount of the water-absorptive resin incorporated into the composition is too small, the resulting composition cannot have desired hydrophilic nature. By pelletizing such a molding material, molding can be easily carried out afterwards.

(2) Molding

The molding of the hydrophilic resin composition of the present invention can be carried out by any one of various conventional molding methods such as injection molding, injection compression molding, compression molding, extrusion molding (pipe molding, sheet molding, film molding, blow molding, various coating molding, etc.) and gas injection, whereby a variety of molded products can be obtained.

(3) Applications

The hydrophilic resin composition of the present invention can be made into a variety of molded products which are suitable as materials for agricultural sheets, building materials, packaging materials, synthetic paper and fiber materials.

EXAMPLES

The present invention will now be explained more specifically by referring to the following examples.

[Raw Materials]

(A-1) Rubber-Like Water-Absorptive Resin Containing Water

In a 5 liter fou neck flask equipped with a stirrer, a reflux condenser, a thermometer and a nitrogen-gas-inlet tube, 1.21 kg of cyclohexane and 9 g of sorbitan monostearate were placed, and dissolved. Thereafter, nitrogen gas was introduced into the flask to purge the remaining oxygen.

Separately, 300 g of acrylic acid was placed in a 3 liter conical beaker, and 70% of carbonyl groups contained in the acrylic acid was neutralized, with cooling, with an aqueous solution of 123 g of sodium hydroxide having a purity of 95% in 96.5 g of water. Next, 150 ppm of sodium hypophosphite, 0.034% of N,N'-methylbisacrylamide and 1.04 g of potassium peroxide were added to and dissolved in the above solution. Thereafter, nitrogen gas was introduced to purge the remaining oxygen.

The content of this conical beaker was added to the content of the above fou neck flask, and the mixture was stirred and bubbled with nitrogen gas. The temperature of the mixture was then raised, and the mixture was allowed to react at an inside temperature of 60° to 65° C. for 3 hours with stirring at a rotational speed of 250 rpm, thereby obtaining a water-absorptive resin in the state of an aggregate of wet particles with the surfaces thereof adhered to each other.

This water-absorptive resin was found to be consisting of 37% by weight of water-absorptive resin particles having an average particle diameter of 150 μm, 58% by weight of water and 5% by weight of cyclohexane. This resin was supplied at a rate of 8 kg/hr to a twin-screw extruder having 4 kneading sections, with the temperature and rotational speed adjusted to 50° C. and 100 rpm, respectively, and kneaded. A rubber-like water-absorptive resin containing water, consisting of 40% by weight of the water-absorptive resin and 60% by weight of water was thus obtained.

(A-2) Water-Absorptive Resin in the State of Independent Particles

The above water-absorptive resin containing water in the sate of an aggregate of particles with the surfaces thereof adhered to each other, consisting of 37% by weight of water-absorptive resin particles having an average particle diameter of 150 pm, 58% by weight of water and 5% by weight of cyclohexane was supplied at a rate of 3 kg/hr to a twin-screw extruder having 3 kneading sections and 3 volatilizing sections, with the temperature and rotational speed adjusted to 160° C. and 200 rpm, respectively, and kneaded. There was thus obtained a water-absorptive resin containing water in the state of independent particles, consisting of 95.5% by weight of water-absorptive resin particles having an average particle diameter of 180 micrometers and 4.5% by weight of water.

(B-1) Modified Ethylene Polymer

Ethylene/glycidyl methacrylate/methyl acrylate terpolymer manufactured by Mitsubishi Chemical Corp., having a glycidyl methacrylate content of 8% by weight, a methyl acrylate content of 10% by weight, an MFR (at 190° C. under a load of 2.16 kg) of 20 g/10 min, a melting point of 97° C., and a crystallinity of 16%.

(B-2) Modified Ethylene Polymer

Ethylene/vinyl acetate copolymer manufactured by Mitsubishi Chemical Corp., having a vinyl acetate content of 15% by weight, an MFR (at 190° C. under a load of 2.16 kg) of 0.5 g/10 min, a melting point of 89° C., and a crystallinity of 22%.

(B-3) Ethylene Polymer

Ethylene homopolymer manufactured by Mitsubishi Chemical Corp., having an MFR (at 190° C. under a load of 2.16 kg) of 2.0 g/10 min, a melting point of 113° C., and a crystallinity of 52%.

(C-1) Crystalline Ethylene Polymer Resin

Ethylene homopolymer manufactured by Mitsubishi Chemical Corp., having an MFR (at 190° C. under a load of 2.16 kg) of 4.0 g/10 min, a melting point of 106° C., and a crystallinity of 47%.

(C-2) Crystalline Propylene Polymer Resin

Propylene homopolymer manufactured by Mitsubishi Chemical Corp., having an MFR (at 230° C. under a load of 2.16 kg) of 0.8 g/10 min, a melting point of 162° C., and a crystallinity of 70%.

(C-3) Polyamide

Polyamide (grade: MC120) manufactured by Kanebo, Ltd., having a melting point of 214° C.

(C-4) Polyester

Polybutylene terephthalate (grade: PRT 724) manufactured by Kanebo, Ltd., having a melting point of 226° C.

(D-1) Surface Active Agent

Sodium dodecylbenzene sulfonate (D-2) Surface Active Agent

Sorbitan stearyl ester (D-3) Surface Active Agent

Glycerol stearyl ester (D-4) Phenol Antioxidant

Tetrakis-[methylene-3-(3',5'-di-t-butyl-4'-hydroxyphenyl)propionate]methane (trade name: Irganox 1010, manufactured by Ciba-Geigy, Ltd.)

(D-5) Sulfur Antioxidant

Dimyristyl-3,3'-thiodipropionate (trade name: DMTP, manufactured by Yoshitomi Pharmaceutical Industries, Ltd.)

(D-6) Hindered Amine Photostabilizer

Bis-[2,2,6,6,-tetramethyl-4-piperidinyl]sebacate (trade name: Sanol LS770, manufactured by Sankyo Co., Ltd.)

(D-7) Benzophenone Ultraviolet Absorber

2-Hydroxy-4-n-octoxybenzophenone (trade name: Cyasolve UV531, manufactured by ACC).

[Evaluation Methods]

(1) Diameter of dispersed water-absorptive resin particles

A molded sheet was used as a specimen. By using a scanning electron micrograph of the specimen, showing the state of resin particles dispersed, the diameter of a resin particle was determined as the diameter (di) of a circle having an area equivalent to the area of the particle by an image analyzer ("Spica II" manufactured by Japan Mapionics Co., Ltd.). A number-average diameter was calculated by the following equation, wherein "ni" is the number of those particles whose diameter corresponds to the diameter (di) defined above. The diameter of dispersed resin particles was indicated by this average diameter.

Number-average diameter $(\mu m) = \Sigma(di) \cdot (ni)/\Sigma(ni)$ (2) Moldability The melt flow rate (MFR) of a resin composition was measured in accordance with JIS K7210-1976, and the moldability of the resin composition was evaluated according to the following standard:

Good: The composition has melt-fluidity, and the MFR thereof is measurable.

Poor: The composition has no melt-fluidity, and the MFR thereof is immeasurable.

3) Retention of shape after water-absorption

Molded sheet was used as a specimen. The specimen was dipped in pure water at a temperature of 70° C. for 2 hours, and then visually observed. The retention of shape of the specimen was evaluated as follows:

Good: No difference was found in the shape of the specimen before and after the dipping treatment.

Poor: The water-absorptive resin was swollen or separated from the sheet by the dipping treatment; the surface of the sheet was drastically changed in shape.

(4) Rate of moisture absorption

A molded sheet was used as a specimen. This specimen was allowed to stand still in a room at a temperature of 23° C. and a relative humidity of 50% for 240 hours, whereby it was allowed to absorb moisture. The rate of moisture absorption was obtained from a change of the weight of the sheet, using the following equation:

Rate of moisture absorption (wt. %)
=[(Weight of the specimen after moisture absorption)
−(Weight of the specimen before moisture absorption)]× 100/(Weight of the specimen before moisture absorption)

(5) Mechanical properties

A resin composition obtained by the first or second step was melt injection-molded by a minimax midget molder, thereby obtaining a specimen. The tensile strength (kgf/cm2) at break and tensile elongation at break (t) of the specimen were measured in accordance with JIS-K7113.

(6) Hydrophilic nature

A molded sheet was used as a specimen. This specimen was allowed, for the conditioning thereof, to stand still in a thermostatic chamber at a temperature of 23° C. and a relative humidity of 50% for 48 hours. Thereafter, this sheet was horizontally placed on a specimen carrier of a goniometer-type contact-angle-measuring apparatus G-1 (trade name) manufactured by Elmer Corp., and approximately 1 microliter of pure water was dropped on the specimen carrier. After 5 minutes, the left- and right-side contact angles of the specimen surface with the water drop were measured.

The same measurement was carried out 8 times (8 water drops) for one sample, and an average value was obtained. The smaller is this contact angle, the better is hydrophilic nature.

(7) Retentivity of the effect of additive

<1> Retentivity of hydrophilic nature

A molded sheet was used as a specimen. This specimen was dipped in water at 60° C. for 3 hours, and then allowed, for the conditioning thereof, to stand still in a thermostatic chamber at a temperature of 23° C. and a relative humidity of 50% for 48 hours. Thereafter, this sheet was horizontally placed on a specimen carrier of a goniometer-type contact-angle-measuring apparatus G-1 (trade name) manufactured by Elmer Corp., and approximately 1 microliter of pure water was dropped on the specimen. After 5 minutes, the left- and right-side contact angles of the specimen surface with the water drop were measured.

The same measurement was carried out 8 times (8 water drops) for one sample, and an average value was obtained. The smaller is this contact angle, and the smaller is the difference between this contact angle and the contact angle obtained in the above-described evaluation of hydrophilic nature, the higher is the retentivity of hydrophilic nature.

<2> Thermal aging resistance

In accordance with JIS K7212-B, a specimen of 65 mm×35 mm×0.5 mm was heated in a Geer oven at 150° C., and the time taken before the specimen caused brittle fracture due to heat deterioration was measured. Three specimens made from one sample were subjected to this measurement, and the thermal aging resistance of the sample was indicated by the average value of the measurement.

<3> Weathering resistance

In accordance with ASTM D2565, a specimen of 150 mm×25 mm×0.5 mm was exposed to light in a Xenon Weather-O-meter 65/XW-WR type (light source: xenon, black panel temperature: 80° C., no rainfall), manufactured by Atlas Electric Devices Co., Ltd. The time taken before the specimen became brittle and caused cracking when it was folded to 180 degrees was measured. Two specimens made from one sample were subjected to this measurement, and the average value was adopted.

<4> Bleedout properties

The specimen used for the evaluation of weathering resistance, exposed to light for 100 hours was visually observed as it was and after it was wiped out with black cloth, thereby carrying out the evaluation.

(8) Additive-holding properties

A specimen was treated for a predetermined period of time under the same conditions as in the evaluation of the retentivity of the effect of additive (thermal aging resistance and weathering resistance). The amount of the remaining additive was measured by using an infrared spectrophotometer and an ultraviolet spectrophotometer. The value after the treatment is shown by taking the value before the treatment as 100.

Example 1

(First Step)

150 parts by weight of the rubber-like water-absorptive resin (A-1) and 40 parts by weight of the modified ethylene polymer (B-1) were melt kneaded for 6 minutes by a Labo Plastmill manufactured by Toyo Seiki Seisakusho, Ltd., with the temperature and rotational speed adjusted to 140° C. and 180 rpm, respectively. A resin composition containing 0.25% by weight of water was thus obtained.

In this first step, which is an initial kneading stage, (A-1) is a continuous phase, and it was confirmed by the change of torque that the viscosity of (A-1) was increased with the passage of time due to the evaporation of water. It is considered that this was caused because (A-1) whose water content had been decreased undergone phase transition to a dispersed phase.

(Second Step)

100 parts by weight of the resin composition obtained in the first step and 400 parts by weight of the crystalline propylene polymer resin (C-2) were melt kneaded for 6 minutes by a Labo Plastmill manufactured by Toyo Seiki Seisakusho, Ltd., with the temperature and rotational speed adjusted to 190° C. and 180 rpm, respectively, thereby obtaining a resin composition.

(Sheet-Molding Step)

The resin compositions obtained in the first and second steps were hot-pressed at a temperature of 230° C. under a pressure of 100 kg/cm2, and respectively molded into a 70 mm square, 50 μm thick sheet.

The resin compositions and sheets were evaluated, and the results are shown in Table 1.

Examples 2 to 12 & Comparative Examples 1 to 6

Resin compositions and sheets, having the formulations shown in Tables 1 and 2 were obtained in the same manner as in Example 1, provided that when the polyamide (C-3) or the polyester (C-4) was used, the hot-press temperature at the time of sheet-molding was changed to 250° C. The resin compositions and sheets obtained were evaluated, and the results are shown in Tables 1 and 2.

TABLE 1

| Example | | 1 | 2 | 3 | 4 | 5 | 6 | 7 | 8 | 9 | 10 | 11 | 12 |
|---|---|---|---|---|---|---|---|---|---|---|---|---|---|
| First Step | | | | | | | | | | | | | |
| Composition | A-1 (parts by weight) | 150 | 150 | 50 | 50 | 150 | 150 | 150 | 150 | 150 | 150 | 10 | 150 |
| | B-1 (parts by weight) | 40 | 40 | 80 | 80 | 40 | 40 | 40 | 40 | — | 40 | 90 | 40 |
| | B-2 (parts by weight) | — | — | — | — | — | — | — | — | 40 | — | — | — |
| Water-Absorptive Resin (wt. %) | | 60 | 60 | 20 | 20 | 60 | 60 | 60 | 60 | 60 | 60 | 4.2 | 60 |
| Evaluation | Diameter of Dispersed Particles | 2.4 | 2.4 | 3.1 | 3.1 | 2.4 | 2.4 | 2.4 | 2.4 | 4.5 | 2.4 | 4.7 | 2.4 |
| | Retention of Shape | good | good | good | good | good | good | good | good | good | good | good | good |
| | Rate of Moisture Absorption | 4.0 | 4.0 | 1.3 | 1.3 | 4.0 | 4.0 | 4.0 | 4.0 | 3.7 | 4.0 | 0.7 | 4.0 |
| | Tensile Strength at Break | 159 | 159 | 141 | 141 | 159 | 159 | 159 | 159 | 143 | 159 | 124 | 159 |
| | Tensile Elongation at Break | 90 | 90 | 119 | 119 | 90 | 90 | 90 | 90 | 123 | 90 | 184 | 90 |
| Second Step | | | | | | | | | | | | | |
| Composition | Resin Composition Obtained in 1st Step | 100 | 100 | 100 | 100 | 100 | 100 | 100 | 100 | 100 | 100 | 100 | 100 |
| | C-1 (parts by weight) | — | — | — | — | — | — | — | — | — | — | — | 400 |
| | C-2 (parts by weight) | 400 | 150 | 30 | 100 | — | — | — | — | 400 | 2500 | 100 | — |
| | C-3 (parts by weight) | — | — | — | — | 400 | 234 | — | — | — | — | — | — |
| | C-4 (parts by weight) | — | — | — | — | — | — | 400 | 234 | — | — | — | — |
| Evaluation | Diameter of Dispersed Particles | 2.2 | 1.9 | 2.5 | 2.5 | 2.0 | 1.9 | 1.8 | 1.9 | 3.4 | 2.4 | 3.2 | 1.8 |
| | Retention of Shape | good | good | good | good | good | good | good | good | good | good | good | good |
| | Rate of Moisture Absorption | 1.7 | 3.2 | 1.9 | 1.3 | 4.3 | 4.6 | 1.7 | 2.1 | 1.1 | 0.4 | 0.4 | 1.6 |
| | Tensile Strength at Break | 361 | 284 | 345 | 372 | 520 | 418 | 472 | 390 | 304 | 378 | 382 | 134 |
| | Tensile Elongation at Break | 374 | 189 | 333 | 360 | 94 | 75 | 120 | 93 | 288 | 372 | 368 | 139 |

TABLE 2

| | Comparative Example | | | | | |
|---|---|---|---|---|---|---|
| | 1 | 2 | 3 | 4 | 5 | 6 |
| First Step | | | | | | |
| Composition | | | | | | |
| A-1 (parts by weight) | — | — | 200 | 150 | — | — |
| A-2 (parts by weight) | — | 30 | — | — | 20 | 20 |
| B-1 (parts by weight) | — | 70 | 20 | — | 80 | 80 |
| B-3 (parts by weight) | — | — | — | 40 | — | — |
| Water-Absorptive Resin (wt. %) | — | 29 | 80 | 60 | 19 | 19 |
| Evaluation | | | | | | |
| Diameter of Dispersed Particles | — | 140 | * | 22 | 130 | 130 |
| Retention of Shape | — | poor | — | poor | poor | poor |
| Rate of Moisture Absorption | — | 1.6 | 5.2 | 3.8 | 1.1 | 1.1 |
| Tensile Strength at Break | — | 90 | 77 | 192 | 100 | 100 |
| Tensile Elongation at Break | — | 83 | 42 | 121 | 102 | 102 |
| Second Step | | | | | | |
| Composition | | | | | | |
| Resin Composition Obtained in 1st Step | — | 100 | 100 | 100 | 100 | 100 |
| C-2 (parts by weight) | 100 | 150 | 400 | 400 | — | — |
| C-3 (parts by weight) | — | — | — | — | 150 | — |
| C-4 (parts by weight) | — | — | — | — | — | 150 |
| Evaluation | | | | | | |
| Diameter of Dispersed Particles | — | 85 | 19 | 17 | 85 | 70 |
| Retention of Shape | good | poor | poor | poor | poor | poor |
| Rate of Moisture Absorption | 0 | 0.8 | 0.9 | 0.7 | 2.5 | 0.5 |
| Tensile Strength at Break | 380 | 284 | 265 | 258 | 311 | 284 |
| Tensile Elongation at Break | 351 | 228 | 240 | 233 | 58 | 72 |

Note)*
The water-absorptive resin is a continuous phase

Example 13

150 parts by weight of the rubber-like water-absorptive resin (A-1), 40 parts by weight of the modified ethylene polymer (B-1) and 150 parts by weight of the crystalline propylene polymer resin (C-2) were melt kneaded for 10 minutes by a Labo Plastmill manufactured by Toyo Seiki Seisakusho, Ltd., with the temperature and rotational speed adjusted to 160° C. and 180 rpm, respectively, thereby obtaining a resin composition.

This resin composition was evaluated, and the results were excellent as follows; the diameter of the dispersed water-absorptive resin particles was 2.0 μm, the retention of shape was good, the rate of moisture absorption was 3.3% by weight, the tensile strength at break was 270 kgf/cm2, and the tensile elongation at break was 172%.

Example 14
(First Step)

The rubber-like water-absorptive resin containing water (A-1), in an amount of 60% by weight when calculated in terms of only the water-absorptive resin and 40% by weight of the modified ethylene polymer (B-1) were melt kneaded for 6 minutes by a Labo Plastmill manufactured by Toyo Seiki Seisakusho, Ltd., with the temperature and rotational speed adjusted to 140° C. and 180 rpm, respectively. A resin composition containing 0.25% by weight of water was thus obtained.

In this first step, which is an initial kneading stage, (A-1) is a continuous phase, and it was confirmed by the change of the torque that the viscosity of (A-1) was increased with the passage of time due to the evaporation of water. It is considered that this was caused because (A-1) whose water content had been decreased undergone phase transition to a dispersed phase.

(Second Step)

30 parts by weight of the resin composition obtained in the first step, 70 parts by weight of the crystalline ethylene polymer resin (C-1) and 1 part by weight of the surface active agent (D-1) were melt kneaded for 6 minutes by a Labo Plastmill manufactured by Toyo Seiki Seisakusho, Ltd., with the temperature and rotational speed adjusted to 190° C. and 180 rpm, respectively, thereby obtaining a resin composition.

(Molding Step)

The resin composition obtained in the second step was hot-pressed at a temperature of 230° C. under a pressure of 100 kg/cm2, and molded into a sheet of 70 mm×70 mm×50 µm (thickness).

The resin composition and sheet were evaluated, and the results are shown in Table 4.

Examples 15 to 23 & Comparative Examples 7 to 13

Resin compositions and sheets were obtained in the same manner as in Example 14 except that the components were blended according to the formulations shown in Table 3 and that when the polyamide or polyester was used, the hot-press temperature at the time of sheet molding was changed to 250° C.

The resin compositions and sheets obtained were evaluated, and the results are shown in Table 4.

Example 24

(Kneading Step)

30 parts by weight of a resin mixture consisting of the rubber-like water-absorptive resin containing water (A-1), in an amount of 60% by weight when calculated in terms of only the water-absorptive resin and 40% by weight of the modified ethylene polymer (B-1), 70 parts by weight of the crystalline ethylene polymer resin (C-1) and 1 part by weight of the surface active agent (D-1) were melt kneaded for 10 minutes by a Labo Plastmill manufactured by Toyo Seiki Seisakusho, Ltd., with the temperature and rotational speed adjusted to 160° C. and 180 rpm, respectively, thereby obtaining a resin composition.

(Molding Step)

The resin composition obtained in the above step was hot-pressed at a temperature of 230° C. under a pressure of 100 kg/cm2, and molded into a sheet of 70 mm×70 mm×50 µm.

The resin composition and sheet were evaluated, and the results are shown in Table 4.

Example 25

(First and Second Steps)

One part by weight of the resin composition obtained in the same manner as in the first step of Example 14, 99 parts by weight of the crystalline propylene polymer resin (C-2) and 0.1 parts by weight of the surface active agent (D-4) were melt kneaded for 6 minutes by a Labo Plastmill manufactured by Toyo Seiki Seisakusho, Ltd., with the temperature and rotational speed adjusted to 180° C. and 180 rpm, respectively, thereby obtaining a resin composition.

(Molding Step)

The resin composition obtained in the second step was hot-pressed at a temperature of 230° C. under a pressure of 100 kg/cm2, and molded into a sheet of 200 mm×200 mm×0.5 mm.

This sheet was evaluated, and the results are shown in Table 6.

Examples 26 to 34 & Comparative Examples 14 to 28

Resin compositions and sheets were obtained in the same manner as in Example 14 except that the components were blended according to the formulations shown in Tables 5 and 7. The resin compositions and sheets obtained were evaluated, and the results are shown in Tables 6 and 8.

TABLE 3

| | Formulation | | | |
|---|---|---|---|---|
| | Type of A, Ratio between A and B (A:B wt. %) | A + B parts by weight | C Type (parts by weight) | D Type (parts by weight) |
| Example 14 | A-1 (60%:40%) | 30 | C-1 (70) | D-1 (1) |
| Example 15 | A-1 (60%:40%) | 30 | C-1 (70) | D-1 (0.5) |
| Example 16 | A-1 (60%:40%) | 30 | C-1 (70) | D-1 (2) |
| Example 17 | A-1 (60%:40%) | 30 | C-1 (70) | D-2 (1) |
| Example 18 | A-1 (60%:40%) | 30 | C-1 (70) | D-3 (1) |
| Example 19 | A-1 (60%:40%) | 5 | C-1 (95) | D-1 (1) |
| Example 20 | A-1 (60%:40%) | 80 | C-1 (20) | D-1 (1) |
| Example 21 | A-1 (60%:40%) | 30 | C-1 (70) | D-1 (1) |
| Example 22 | A-1 (60%:40%) | 30 | C-1 (70) | D-1 (1) |
| Example 23 | A-1 (60%:40%) | 30 | C-1 (70) | D-1 (1) |
| Example 24 | A-1 (60%:40%) | 30 | C-1 (70) | D-1 (1) |
| Comparative Example 7 | — (— 100%) | 30 | C-1 (70) | D-1 (1) |
| Comparative Example 8 | — (— —) | — | C-1 (100) | D-1 (1) |
| Comparative Example 9 | — (— —) | — | C-1 (100) | — (—) |
| Comparative Example 10 | A-2 (60%:40%) | 30 | C-1 (70) | D-1 (1) |
| Comparative Example 11 | — (— 100%) | 30 | C-1 (70) | D-1 (1) |
| Comparative Example 12 | — (— 100%) | 30 | C-1 (70) | D-1 (1) |
| Comparative Example 13 | — (— 100%) | 30 | C-1 (70) | D-1 (1) |

Note) The type of B is "B-1".

TABLE 4

|  | Content of Water-Absorptive Resin (wt. %) | Diameter of Dispersed Water-Absorptive Resin Particles (μm) | Moldability | Retention of Shape after Water-Absorption | Contact Angle (degree) Before dipped in water | Contact Angle (degree) After dipped in water |
| --- | --- | --- | --- | --- | --- | --- |
| Example 15 | 18.0 | 1.9 | good | good | 61 | 60 |
| Example 15 | 18.0 | 2.0 | good | good | 63 | 60 |
| Example 16 | 18.0 | 2.0 | good | good | 61 | 62 |
| Example 17 | 18.0 | 1.9 | good | good | 64 | 62 |
| Example 18 | 18.0 | 2.0 | good | good | 67 | 63 |
| Example 19 | 3.0 | 2.3 | good | good | 69 | 72 |
| Example 20 | 48.0 | 2.0 | good | good | 64 | 57 |
| Example 21 | 18.0 | 2.2 | good | good | 79 | 81 |
| Example 22 | 18.0 | 2.0 | good | good | 65 | 68 |
| Example 23 | 18.0 | 1.9 | good | good | 74 | 77 |
| Example 24 | 18.0 | 2.4 | good | good | 63 | 68 |
| Comparative Example 7 | 0.0 | — | good | — | 75 | 89 |
| Comparative Example 8 | 0.0 | — | good | — | 73 | 88 |
| Comparative Example 9 | 0.0 | — | good | — | 98 | 97 |
| Comparative Example 10 | 18.0 | immeasurable | good | poor | immeasurable | immeasurable |
| Comparative Example 11 | 0.0 | — | good | — | 79 | 90 |
| Comparative Example 12 | 0.0 | — | good | — | 67 | 78 |
| Comparative Example 13 | 0.0 | — | good | — | 77 | 88 |

TABLE 5

|  | Formulation | | | |
| --- | --- | --- | --- | --- |
|  | Type of A, Blend Ratio A:B (A:B) | A + B (parts by weight) | C Type (parts by weight) | D Type (parts by weight) |
| Example 25 | A-1 (60%:40%) | 1 | C-2 (99) | D-4 (0.1) |
| Example 26 | A-1 (60%:40%) | 5 | C-2 (95) | D-4 (0.1) |
| Example 27 | A-1 (60%:40%) | 10 | C-2 (90) | D-4 (0.1) |
| Example 28 | A-1 (60%:40%) | 20 | C-2 (80) | D-4 (0.1) |
| Example 29 | A-1 (60%:40%) | 50 | C-2 (50) | D-4 (0.1) |
| Comparative Example 14 | — — — | — | C-2 (100) | D-4 (0.1) |
| Comparative Example 15 | — (—:100%) | 2 | C-2 (98) | D-4 (0.1) |
| Comparative Example 16 | — (—:100%) | 5 | C-2 (95) | D-4 (0.1) |
| Comparative Example 17 | A-1 (60%:40%) | 0.1 | C-2 (99.9) | D-4 (0.1) |
| Comparative Example 18 | A-2 (60%:40%) | 5 | C-2 (95) | D-4 (0.1) |

TABLE 6

|  | Water-Absorptive Resin Content (wt. %) | Water-Absorptive Resin Diameter of Dispersed Particle (μm) | Moldability | Retention of Shape after Water-Absorption | Evaluation of Additive: Item & Result Item | Evaluation of Additive: Item & Result Result | Evaluation of Additive: Item & Result Item | Evaluation of Additive: Item & Result Result | Remaining Rate of Additive and Treatment Time (%) (hour) |
| --- | --- | --- | --- | --- | --- | --- | --- | --- | --- |
| Example 25 | 0.6 | 1.9 | good | good | Thermal aging resistance | 220 | Bleedout Properties | good | 60 (100) |
| Example 26 | 3.0 | 1.9 | good | good | Thermal aging resistance | 280 | Bleedout Properties | good | 68 (100) |
| Example 27 | 6.0 | 1.9 | good | good | Thermal aging resistance | 330 | Bleedout Properties | good | 73 (100) |
| Example 28 | 12.0 | 2.0 | good | good | Thermal aging resistance | 360 | Bleedout Properties | good | 75 (100) |
| Example 29 | 30.0 | 2.0 | good | good | Thermal aging resistance | 400 | Bleedout Properties | good | 77 (100) |
| Comparative Example 14 | — | — | good | good | Thermal aging resistance | 190 | Bleedout Properties | good | 53 (100) |
| Comparative Example 15 | — | — | good | good | Thermal aging resistance | 170 | Bleedout Properties | good | 49 (100) |
| Comparative Example 16 | — | — | good | good | Thermal aging resistance | 170 | Bleedout Properties | good | 47 (100) |
| Comparative Example 17 | 0.06 | 1.9 | good | good | Thermal aging resistance | 200 | Bleedout Properties | good | 55 (100) |
| Comparative Example 18 | 3.0 | visible | good | poor | Thermal aging resistance | 220 | Bleedout Properties | good | 60 (100) |

TABLE 7

| | Type of A, Blend Ratio A:B (A:B) | A + B (parts by weight) | C Type (parts by weight) | D Type (parts by weight) | D Type (parts by weight) |
|---|---|---|---|---|---|
| Example 30 | A-1 (60%:40%) | 5 | C-2 (95) | D-4 (0.1) + | D-5 (0.2) |
| Example 19 | — — — | — | C-2 (100) | D-4 (0.1) + | D-5 (0.2) |
| Example 20 | — (—:100%) | 5 | C-2 (95) | D-4 (0.1) + | D-5 (0.2) |
| Example 31 | A-1 (60%:40%) | 5 | C-2 (95) | D-7 (0.2) | |
| Comparative Example 21 | — — — | — | C-2 (100) | D-7 (0.2) | |
| Comparative Example 22 | — (—:100%) | 5 | C-2 (95) | D-7 (0.2) | |
| Example 32 | A-1 (60%:40%) | 5 | C-2 (95) | D-8 (0.2) | |
| Comparative Example 23 | — — — | — | C-2 (99) | D-8 (0.2) | |
| Comparative Example 24 | — (—:100%) | 5 | C-2 (99) | D-8 (0.2) | |
| Example 33 | A-1 (60%:40%) | 5 | C-1 (95) | D-4 (0.1) | |
| Comparative Example 25 | — — — | — | C-1 (100) | D-4 (0.1) | |
| Comparative Example 26 | — (—:100%) | 5 | C-1 (95) | D-4 (0.1) | |
| Example 34 | A-1 (60%:40%) | 5 | C-1 (95) | D-7 (1.0) | |
| Comparative Example 27 | — — — | — | C-1 (100) | D-7 (0.1) | |
| Comparative Example 28 | — (—:100%) | 5 | C-1 (95) | D-7 (0.1) | |

The type of B is "B-1". 0.05 parts by weight of calcium stearate was incorporated, in addition to the above components, into each composition.

TABLE 8

| | Water-Absorptive Resin Content (wt. %) | Diameter of Dispersed Particle (μm) | Mold-ability | Retention of Shape after Water-Absorption | Evaluation of Additive: Item | Result | Evaluation of Additive: Item | Result | Remaining Rate of Additive (%) | Treatment Time (hour) |
|---|---|---|---|---|---|---|---|---|---|---|
| Example 30 | 3.0 | 2.0 | good | good | Thermal aging resistance | 930 | Bleedout Properties | good | 52 | (500) |
| Comparative Example 19 | — | — | good | good | Thermal aging resistance | 850 | Bleedout Properties | good | 47 | (500) |
| Comparative Example 20 | — | — | good | good | Thermal aging resistance | 800 | Bleedout Properties | good | 44 | (500) |
| Example 31 | 3.0 | 2.1 | good | good | Weather resistance | 800 | Bleedout Properties | good | 70 | (300) |
| Comparative Example 21 | — | — | good | good | Weather resistance | 540 | Bleedout Properties | poor | 56 | (300) |
| Comparative Example 22 | — | — | good | good | Weather resistance | 440 | Bleedout Properties | poor | 45 | (300) |
| Example 32 | 3.0 | 2.3 | good | good | Weather resistance | 740 | Bleedout Properties | good | 70 | (300) |
| Comparative Example 23 | — | — | good | good | Weather resistance | 580 | Bleedout Properties | poor | 61 | (300) |
| Comparative Example 24 | — | — | good | good | Weather resistance | 420 | Bleedout Properties | poor | 46 | (300) |
| Example 33 | 3.0 | 2.1 | good | good | Thermal aging resistance | 480 | Bleedout Properties | good | 63 | (200) |
| Comparative Example 25 | — | — | good | good | Thermal aging resistance | 320 | Bleedout Properties | good | 44 | (200) |
| Comparative Example 26 | — | — | good | good | Thermal aging resistance | 290 | Bleedout Properties | good | 38 | (200) |
| Example 34 | 3.0 | 2.2 | good | good | Weather resistance | 980 | Bleedout Properties | good | 70 | (400) |
| Comparative Example 27 | — | — | good | good | Weather resistance | 700 | Bleedout Properties | poor | 54 | (400) |
| Comparative Example 28 | — | — | good | good | Weather resistance | 570 | Bleedout Properties | poor | 44 | (400) |

We claim:

1. A process for producing a hydrophilic resin composition, comprising kneading a water-absorptive resin (component A), to obtain a rubber-like resin, incorporating a thermoplastic modified ethylene polymer (component B) and, if desired, a thermoplastic polymer (component C) and an additive (component D) into the rubber-like resin, and melt kneading the mixture;

wherein said water-absorptive resin (component A) contains 25 to 80% by weight water; said thermoplastic modified ethylene polymer (component B) has a functional group that can chemically bond to or is compatible with said water-absorptive resin; said thermoplastic polymer (component C) is different from component B; said water-absorptive resin (component A) is present in an amount of 0.1 to 70% by weight of the total amount of the components A to C; and said component A is uniformly dispersed in the thermoplastic polymers (components B and C), in the form of particles having an average particle diameter of 5 μm or less.

2. The process according to claim 1, wherein the ratio between the component A and the component B is 1–70% by weight and 99-30% by weight, and 99 to 0 parts by weight of the component C is incorporated into 1 to 100 parts by weight of the total of the components A and B (the total amount of the components A, B and C being 100 parts by weight).

3. The process according to claim 1, wherein the water-absorptive resin (component A) is at least one resin selected from the group consisting of acrylate crosslinked polymers and methacrylate crosslinked polymers.

4. The process according to claim 1, wherein the thermoplastic polymer (component C) is at least one polymer selected from the group consisting of polyolefins, polyamides and polyesters.

5. The process according to claim 1, wherein the modified ethylene polymer (component B) has a melting point measured by a DSC of 80° to 120° C.

6. The process according to any one of claim 1, comprising 0.05 to 10 parts by weight of an additive (component D) for 100 parts by weight of the total of the components A to C.

7. The process according to claim 1, wherein the additive (component D) is a surface active agent.

8. The process according to claim 1, wherein the additive (component D) is at least one agent selected from the group consisting of antioxidants, ultraviolet absorbers and photo-stabilizers.

9. The process according to claim 1, wherein the melt kneading was carried out by firstly melt kneading the rubber-like water-absorptive resin (component A) and the modified ethylene polymer (component B) to obtain a composition, adding the thermoplastic polymer (component C) and the additive (component D) to the composition, and melt kneading the mixture.

* * * * *